Dec. 6, 1927.  1,651,365
A. S. H. BENDER
VEHICLE TOWING MECHANISM
Filed Aug. 24, 1925   2 Sheets-Sheet 1
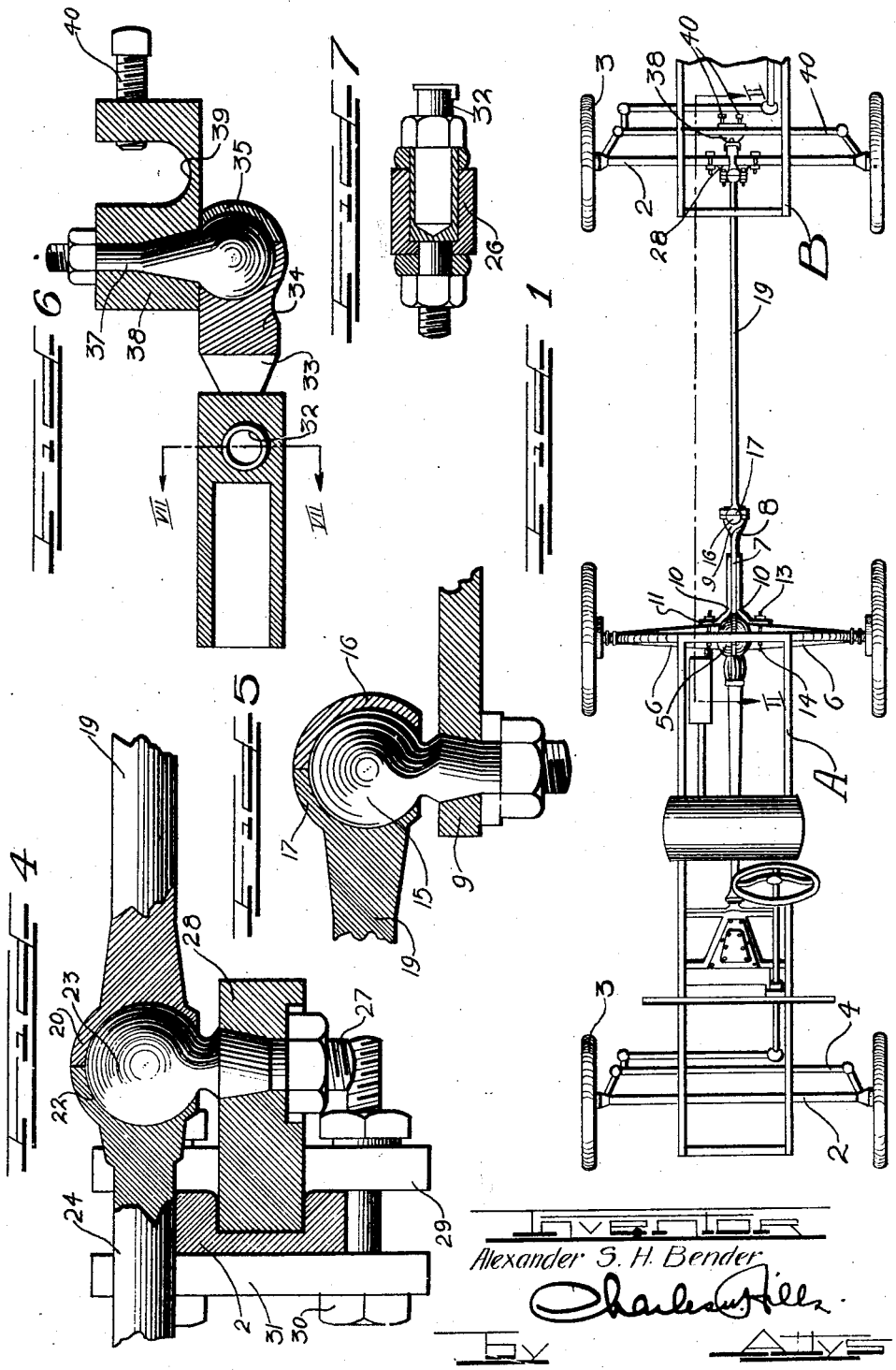
Alexander S. H. Bender Dec. 6, 1927.  
A. S. H. BENDER  
VEHICLE TOWING MECHANISM  
Filed Aug. 24, 1925
1,651,365
2 Sheets-Sheet 2
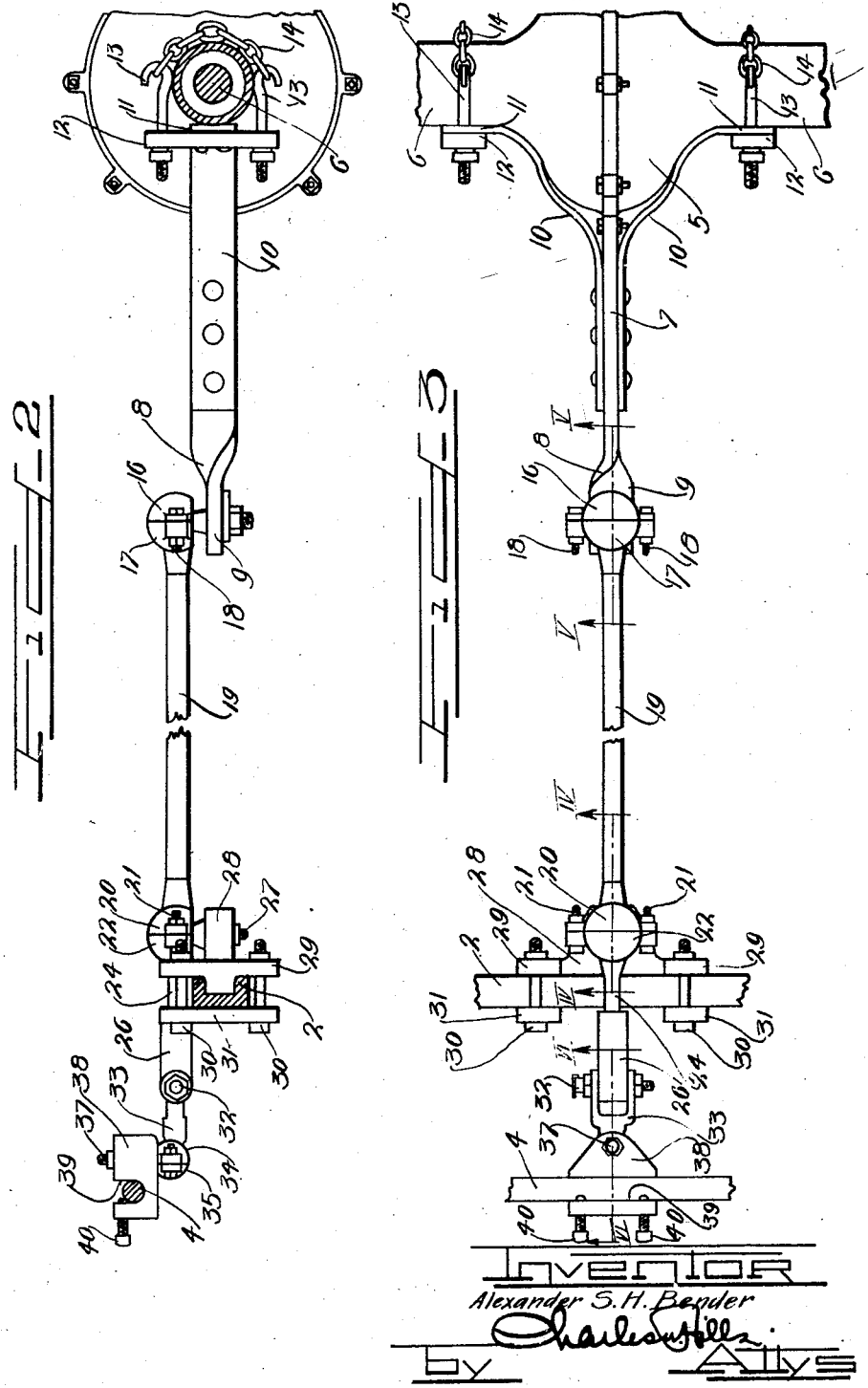
INVENTOR  
Alexander S. H. Bender Patented Dec. 6, 1927.

1,651,365

UNITED STATES PATENT OFFICE.

ALEXANDER S. H. BENDER, OF CHICAGO, ILLINOIS.

VEHICLE TOWING MECHANISM.

Application filed August 24, 1925. Serial No. 51,897.

In delivering automobiles from the factory to distributing stations or to individuals in distant cities it has been necessary to provide a driver for each of the automobiles to be delivered, this arrangement, of course, being necessary when the automobiles are run on their own power and are not shipped by freight.

To obviate the necessity of providing a driver for each automobile to be delivered and thereby reducing expenses of transportation which are incurred by each driver to and from the factory, an improved trailing or towing mechanism has been provided whereby one automobile may be towed by another with only one driver in charge of both cars.

This invention relates more particularly to an improved and simplified towing mechanism for motor vehicles and the like whereby one car may tow and steer a second car connected to said first car by means of the improved towing mechanism.

It is an object of this invention to provide a towing mechanism adapted to be connected to the differential housing of one automobile and to the front axle and steering bar of a second automobile which is to be towed by the first.

It is also an object of this invention to connect a plurality of automobiles by means of towing mechanisms, each of which comprises a plurality of connected shafts or bars which are connected by means of universal joints with one of said shafts or bars having sliding engagement with a coupling mechanism adapted to be connected with the steering bar of the vehicle which is to be towed.

It is an important object of this invention to provide a simplified vehicle towing mechanism adapted to be connected to the rear end of a leading automobile and to the front end of a trailing automobile with said mechanism arranged to permit proper steering of the trailing automobile so that the trailing automobile will follow in the tracks of the leading automobile.

Other and further important objects of this invention will be apparent from the disclosures in the specification and drawings.

The invention (in a preferred form) is illustrated in the drawings and hereinafter more fully described.

On the drawings:

Figure 1 is a plan view of an automobile chassis and a fragmentary portion of an automobile chassis which is to be towed, said automobiles being connected by means of an improved towing mechanism embodying the principles of this invention.

Figure 2 is an enlarged fragmentary view of the towing mechanism taken on line II—II of Figure 1.

Figure 3 is a top plan view of the towing mechanism as shown in Figure 2, including fragmentary portions of automobiles.

Figure 4 is an enlarged fragmentary detail section taken on line IV—IV of Figure 3.

Figure 5 is a fragmentary detail section taken on line V—V of Figure 3 with parts in elevation.

Figure 6 is an enlarged detail section on line VI—VI of Figure 3 with parts in elevation.

Figure 7 is a detail section taken on line VII—VII of Figure 6.

As shown on the drawings:

The reference numeral 1 indicates an automobile chassis having a front axle 2 and front wheels 3, said wheels adapted to be steered by means of a steering bar 4 operable through the steering rod of the automobile. The chassis is also provided with a differential housing 5 and a rear axle housing 6. The improved towing mechanism of this invention is adapted to have one end thereof connected securely to the rear axle housing of a leading automobile indicated by the letter A, while the other end of the towing mechanism is adapted to be connected to the front axle 2 and steering bar 4 of a second automobile B, which is to be towed.

The improved towing mechanism comprises the main bar 7, twisted at 8 to permit one end 9 to be positioned at right angles to the portion 7. Rigidly bolted or otherwise secured to the opposite sides of the main bar 7 are a pair of brackets 10 having parts thereof curved to permit said brackets to fit around the differential housing 5 of the automobile A. Each of the brackets 10 has one end thereof bent to afford an arm 11 to which is rigidly riveted or otherwise secured a transversely disposed bar or plate 12, the ends of which are apertured to receive the threaded bolt ends of a pair of hooks 13. The hooks as indicated in Figure 2 are disposed above and below the rear axle housing 6 and are connected by means of a chain 14. The arm 7, together with the curved brackets 10 afford a yoked member which may be readily secured in place on the rear axle housing of the automobile by means of the hooks 13 and chains 14 as hereinbefore fully described and as clearly illustrated in Figures 2 and 3 of the drawings.

Securely bolted to the end 9 of the main bar 7 is a ball member 15 (Figure 5) which is engaged by means of a pair of abutting spherical sections 16 and 17, both of which are provided with apertured lugs to permit the spherical sections to be securely connected to one another by means of bolts 18 to afford a universal joint between said connected sections 16 and 17 and the ball member 15 inclosed thereby. The section 17 is integrally formed on one end of a connecting rod or bar 19, the other end of which has integrally formed thereon a socket or spherical section 20 having apertured lugs to permit the same to be bolted by bolts 20 to a socket or spherical section 22 for the purpose of inclosing a ball member 23. The socket or spherical sections 20 and 22, together with the ball 23 afford a universal or ball and socket joint as clearly illustrated in Figure 4. The socket section 22 is integrally formed on one end of a stub shaft or rod 24 which is of cylindrical shape to permit the same to be slidably engaged within a cylindrical recess or pocket 24 provided in one end of sleeve 26. The ball member 23 has an integral bolt portion 27 which is rigidly secured in an apertured bracket 28 having integrally formed thereon a pair of apertured transverse clamping bars 29. Each of the apertured bars 29 carries a pair of bolts 30 which also pass through a pair of clamping bars 31 to afford an arrangement whereby the bracket 28 may be rigidly clamped to the middle portion of the front axle 2 of the automobile B, which is to be towed.

The stub shaft 24 is positioned to project over the front axle 2 of the second automobile, as clearly illustrated in Figures 3 and 4.

The closed end of the sleeve 26 is transversely passaged to receive a self-oiling bolt 32 illustrated in detail in Figure 7. The bolt 32 serves to hold a yoked member or fork 33 pivotally connected with the sleeve 26, said sleeve being movably engaged on the bolt 32. Integrally formed on one end of the yoked member 33 is a socket or spherical member 34 having apertured lugs to permit the same to be rigidly bolted to a socket or spherical member 35 which is also provided with apertured lugs to receive connecting bolts. The socket or spherical sections 34 and 35 inclose a ball member 36 to afford a universal joint or ball and socket connection. The ball member 36 has a bolt 37 integrally formed thereon to hold said ball rigidly secured to a bracket or casting 38 having a transverse groove 39 within which the steering bar 4 of the automobile B is adapted to set. Set screws 40 are provided in the bracket 38 and project into the groove 39 to permit said bracket 38 to be rigidly secured to the steering bar 4.

The operation is as follows:

The improved towing mechanism embodying the principles of this invention is adapted for use when it becomes necessary to deliver two automobiles by using only one driver, said driver adapted to operate one of the automobiles while the second automobile is adapted to be towed and steered by means of the towing mechanism connecting the rear end of the driven car to the front end of the towed car. This arrangement is very simple and eliminates the expense which would be incurred if, as under the old system, a separate driver were necessary for each of the cars to be delivered. The improved towing mechanism may be readily secured in place by placing the yoked member 7—10 around the rear portion of the differential housing of the automobile A and then clamping said yoked member in place by means of the chains 14 and the hooks 13 as clearly illustrated in Figures 2 and 3 of the drawings. The clamping bracket 28 and the clamping bars 29 and 31 are next rigidly secured to the middle portion of the front axle 2 of the automobile B by means of the bolts 30. The bracket 28 is secured in position to permit the stub shaft to project over the top of the front axle 2 of the rear car. The clamping bracket 38 is rigidly secured to the middle portion of the steering bar 4 of the automobile B by means of the set screws 40. The pivoted sleeve 26 carried by the yoke 33 is slidably engaged over the projecting end of the stub shaft 24, thereby affording a sliding connection between the bracket mechanism 28 on the front axle 2 of the automobile B and the steering bar 4. The pivotal connection between the sleeve 26 and the yoke 33 and the ball and socket connection between the yoke 33 and the bracket 38 afford a universal joint permitting the steering bar 4 to be operated for the purpose of steering the front wheels 3 of the towed automobile B. The steering force is transmitted from the leading automobile A through the main bar 7 and the connecting rod 19 to the front axle 2 of the trailing automobile B and thence by means of the stub shaft 24 and the sleeve 26 to the steering bar 4 and thence to the wheels on the front axle 2.

It will thus be noted that the two automobiles A and B may be readily connected together by the improved towing mechanism and that the peculiar arrangement of said towing mechanism permits the automobile B not only to be towed by the automobile A but also acts to cause the wheels of the automobile B to track in the tracks of the leading or driven automobile A.

When the cars have been delivered the towing mechanism may be readily removed from the cars and returned to the shipper for re-use. While a towing mechanism has been described as connecting two automobiles A and B to permit both of said automobiles to be delivered by a single driver, it will of course be understood that if desired more than two automobiles may be connected by means of the improved towing mechanism to form a train of automobiles.

I am aware that numerous details of construction may be varied through a wide range without departing from the principles of this invention, and I therefore do not purpose limiting the patent granted otherwise than necessitated by the prior art.

I claim as my invention:

1. A vehicle towing mechanism comprising a yoked mechanism, means for removably securing the same around the differential housing and the rear axle housing of an automobile, a connecting rod, a universal joint between said connecting rod and said yoked mechanism, a clamping mechanism adapted to be rigidly and removably secured to the front axle of a second automobile, a stub shaft rigidly secured to said connecting rod, a universal joint between the said connecting rod and stub shaft and said clamping mechanism, a bracket adapted to be rigidly and removably secured to the steering bar of said second automobile, a yoked member, a universal joint between said yoked member and said clamping bracket, and a sleeve pivotally connected to said yoked member and having slidable engagement with said stub shaft.

2. A vehicle towing mechanism comprising a yoked mechanism, means for removably securing the same to a rear axle housing of an automobile in a position to straddle the differential housing, a connecting rod, a ball and socket joint connecting one end of said connecting rod with said yoked mechanism, a bracket adapted to be rigidly clamped on the middle portion of the front axle of a second automobile, a ball and socket joint between the said bracket and the other end of said connecting rod, a stub shaft rigidly connected to said connecting rod and projecting over said front axle of the second automobile, a bracket device rigidly secured to the steering bar of said second automobile and a sleeve mechanism movably connecting with said bracket device and slidably engaged on said stub shaft.

3. A vehicle towing mechanism of the class described, comprising a connecting rod, a stub shaft secured on one end thereof, a clamping bracket, a ball and socket joint between said connecting rod and said clamping bracket, a yoked member, a ball and socket joint between said yoked member and said connecting rod, hooks carried by said yoked member, chains connected to said hooks to permit the hooks and chains to be engaged around the rear axle housing of an automobile, a sleeve slidably engaged on said stub shaft and another bracket mechanism pivotally connected to said sleeve to permit said sleeve to be connected with the steering bar of a second automobile.

4. A vehicle towing mechanism comprising a pair of clamping mechanisms adapted to be secured to the rear and front ends of two automobiles, connecting members between said clamping mechanisms, a plurality of universal joints between said connecting members, a stub shaft secured to one of said connecting members, a clamping device adapted to be secured to the steering bracket of one of said automobiles, a sleeve slidably engaged on said stub shaft, and a universal joint between said sleeve and said clamping device.

5. A vehicle towing mechanism comprising a pair of clamping devices, members connecting the same, a plurality of universal joints in said members, a stub shaft connected to said members, a sleeve slidably engaged thereon, a universal joint connected with said sleeve, and a third bracket device supporting said universal joint.

6. A vehicle towing mechanism comprising a pair of clamping devices adapted to be secured to the front axle and steering bar of an automobile, a telescoping connection between said clamping devices, a yoked mechanism, means for removably securing the same to the rear axle housing of a second automobile, a connecting rod and universal joints at the ends of said connecting rod for coupling the same to said yoked mechanism and to the bracket device secured to the front axle of said first mentioned automobile.

7. A vehicle towing mechanism comprising a pair of clamping devices adapted to be secured to two automobiles, connecting members between said clamping devices, ball and socket connections between said various connecting members, a third clamping device, a ball and socket joint thereon, and a telescoping connection between said last mentioned ball and socket joint and one of the previously mentioned ball and socket connections.

In testimony whereof I have hereunto subscribed my name.

ALEXANDER S. H. BENDER